United States Patent [19]

Longfield et al.

[11] Patent Number: 5,898,667
[45] Date of Patent: Apr. 27, 1999

[54] SS7 NETWORK MANAGEMENT PRIMESHIP

[75] Inventors: Michael Longfield; Judson Jay Patterson, both of Cary, N.C.

[73] Assignee: Northern Telecom Limited, Montreal, Canada

[21] Appl. No.: 08/775,564

[22] Filed: Dec. 31, 1996

[51] Int. Cl.⁶ .............................. G06F 11/00; H04M 7/00
[52] U.S. Cl. ..................... 370/225; 379/230; 370/218
[58] Field of Search ..................... 370/218, 219, 370/220, 225, 228, 377, 385, 410, 522, 524; 379/229, 230, 220; 340/825.01

[56] References Cited

U.S. PATENT DOCUMENTS

| | | | |
|---|---|---|---|
| 5,650,998 | 7/1997 | Angenot et al. | 370/225 |
| 5,708,702 | 1/1998 | De Paul et al. | 379/230 |
| 5,764,624 | 6/1998 | Endo et al. | 370/218 |

*Primary Examiner*—Chi H. Pham
*Assistant Examiner*—Afsar Qureshi
*Attorney, Agent, or Firm*—Finnegan, Henderson, Farabow, Garrett & Dunner, L.L.P.

[57] ABSTRACT

A signaling transfer point (STP) includes a communications controller, node maintenance unit, and a plurality of link-interface units, and designates to the individual link-interface units primary responsibility for management of resources coupled to the STP. When one of the resources experiences a problem, a prime link-interface unit for that resource assumes management of the resource and controls communication by the STP with the resource. If a prime link-interface unit fails, either the node maintenance unit or look-up tables within the other link-interface units designate which other link-interface unit will become prime for the resource covered by the failed link-interface unit.

27 Claims, 6 Drawing Sheets

SS7 NETWORK MANAGEMENT PRIMESHIP

BACKGROUND OF THE INVENTION

The present invention relates generally to a technique for managing resources in a Common Channel Signaling (CCS) network, and specifically to a method and apparatus for decentralizing the management of network resources to interface units within a signaling point.

Common Channel Signaling (CCS) provides a dedicated supervisory network for segregating signaling information from voice and data information in a telecommunications network. CCS was developed to meet the increased demands placed on the public telecommunications network by the growing market for voice, data, and information services. Previous signaling systems sent call setup and routing information over the same trunk circuit used for voice transmission. With CCS, a single out-of-band channel conveys signaling information relating to call setup, routing, and network management, among other things. Signaling System No. 7 (SS7), an international protocol standard for CCS communications, creates a universal format for communicating signaling information in a CCS network (CCS7).

CCS7 networks also provide numerous advanced features for telecommunications users. By enabling communication between processors in central offices, CCS7 permits on-line or external databases to be queried. This capability opens access to such features as network-wide automated calling card service, Advanced Intelligent Network-based residential and business services, Custom Local Area Signaling Services, and Virtual Private Networking. Other advantages provided by CCS7 include Calling Number/Name Delivery and Automatic Callback to work across an entire network rather than just between subscribers served by the same central office.

Figure 1:
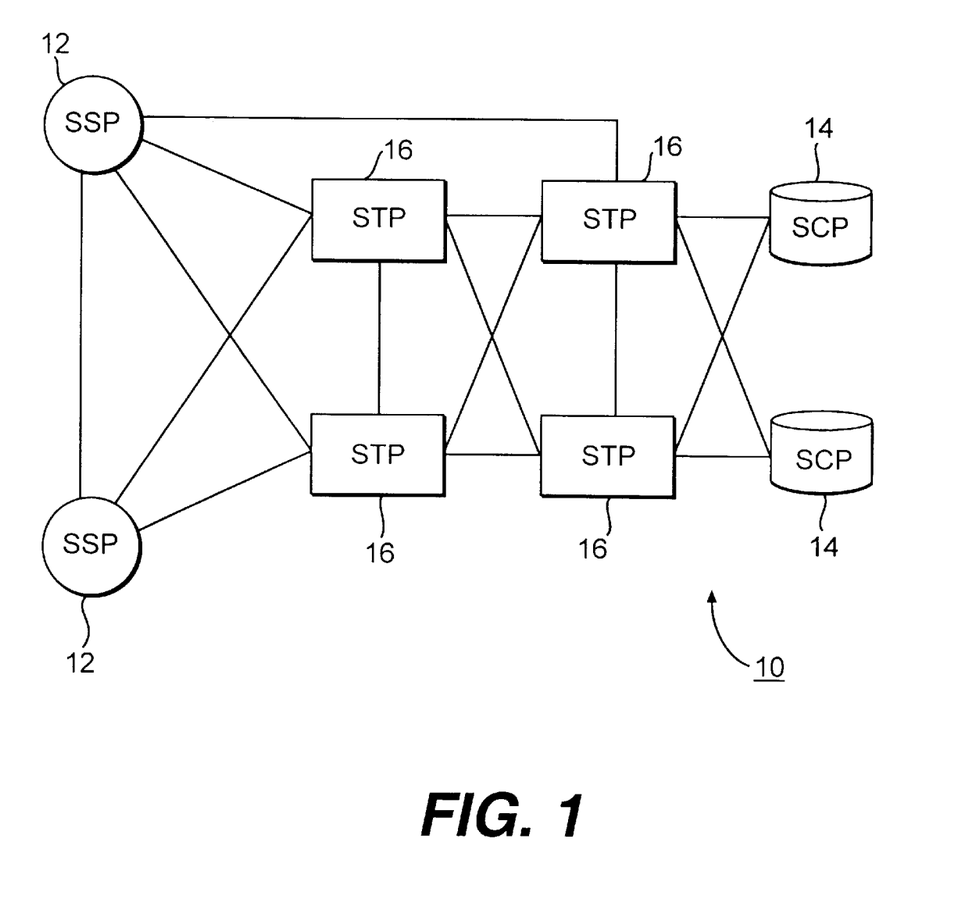
FIG. 1 is a block diagram of a Common Channel Signaling network configuration for use with the present invention.

FIG. 1 illustrates a typical CCS7 network configuration with three key signaling points: a Service Switching Points (SSPs) 12; a Service Control Points (SCPs) 14; and a Signaling Transfer Point (STPs) 16. SSPs 12 are located at a central office to provide CCS 7 trunk signaling and the capability to query a database to determine call routing. SCPs 14 house databases with call routing information that SSPs and other network elements use to provide advanced services in a telecommunications network. STPs 16 route CCS7 messages between the signaling points and control access to the CCS7 network.

Unlike other nodes in a CCS7 network 10, STPs 16 do not generally act as a source or ultimate destination of CCS7 application messages. Instead they function as both a static and dynamic routing database that control access to, and direct call signaling between, a variety of CCS7 nodes and networks. STPs 16 monitor, maintain, and report different levels of information concerning the availability and unavailability of CCS7 nodes, routes, and services.

Signaling points such as STPs 16 support external resources in the CCS7 network 10, such as links, linksets, routes, routesets, and subsystem databases resident in other signaling points. Each signaling point relies on these resources to effectively transmit signaling information or to access appropriate sources of information within the CCS7 network 10.

Managing these resources by the signaling point must take place to ensure the continued and reliable availability of the resources. Generally, resource management by an STP 16 includes both network management and subsystem, or application, management. Through network management, the STP 16 ensures the integrity of individual signaling links by monitoring the links and accessing errors that occur on them.

Typically, network management separates into three categories: link management, traffic management, and route management. Link management checks for continued integrity of the links. Traffic management enables the signaling point to route traffic around failed links within a linkset. Route management addresses the accessibility of signaling points in a CCS7 network, and advises other signaling points in the network if one of the signaling points cannot be reached. Similarly, subsystem management focuses on the availability of an application or subsystem database within the CCS7 network. Overall, resource management by a signaling point requires persistent attention to the status of resources through monitoring and communication.

Conventional signaling points, such as STPs 16, include a central processor for controlling functions performed by the signaling point, as well as for managing resources in the CCS7 network. Interface units within the signaling point provide the immediate interface between the signaling point and the external CCS7 network 10. The interface units within a conventional signaling point typically gather management information and pass it to the central processor for consideration. For instance, if a subsystem database within an SCP stops responding, the central processor within the STP will take appropriate action to poll the SCP to derive the database's status. In the meantime, the central processor will, if possible, route relevant communications of the STP to an alternate SCP.

The conventional signaling points with centralized control of resource management have several drawbacks. For one, the central processor of the signaling point has numerous other processing functions to perform, so resource management adds an unnecessary burden to the processing capacity of the central processor. This drawback becomes especially acute as the number of network resources supported by a signaling point grows. Similarly, if several management conditions arise simultaneously, e.g. numerous resources experience problems, the central processor within a signaling point may become a bottleneck for managing the resources and may slow the responsiveness of the signaling point.

In light of the foregoing, a need exists for a signaling point and a method for managing communication with network resources that does not burden the central processor of the signaling point. A need also exists for a signaling point and a method for managing network resources that enables rapid response to a plurality of simultaneous network resource management conditions.

SUMMARY OF THE INVENTION

Additional objects and advantages of the invention will be set forth in part in the description which follows, and in part will be obvious from the description, or may be learned by practice of the invention.

To achieve these and other objects and advantages, and in accordance with the purpose of the invention as embodied and broadly described herein, a signaling point consistent with this invention for use in a common channel signaling (CCS) network, the signaling point comprising a central processor; a plurality of link-interface units coupled to the central processor, each of the plurality of link-interface units having a link processor, the plurality of link-interface units communicatively coupling the signaling point to a plurality of resources in the CCS network, one of the plurality of link-interface units managing communication by the plurality of link-interface units with at least one of the plurality of resources in accordance with a status of the at least one resource; and a node maintenance unit coupled to the central processor and the plurality of link-interface units for monitoring a status of the plurality of link-interface units.

A method for managing resources consistent with this invention in a common channel signaling (CCS) network from a telecommunications switch, where the telecommunications switch includes a plurality of interface units and a central processor, and where the plurality of interface units communicatively couple the switch to a plurality of resources in the CCS network. The method comprises the steps of detecting, at any of the interface units, a problem condition of one of the plurality of resources; communicating the problem condition of the one of the plurality of resources to the plurality of interface units; verifying, by a processor within a predetermined one of the plurality of interface units, the problem condition; and coordinating, at the processor within the predetermined one of the plurality of interface units, further communication by the plurality of interface units intended for the one resource until the problem condition of the one resource changes.

Another method consistent with this invention for managing resources in a common channel signaling (CCS) network from a signaling point, where the signaling point includes a plurality of link-interface units, a central processor, and a node maintenance unit, where the plurality of link-interface units communicatively couples the signaling point to a plurality of resources in the CCS network, and where each of the plurality of link-interface units has a link processor. The method comprises the steps of determining, at one of the plurality of link-interface units, a status of at least one of the plurality of resources; and managing, at the one of the plurality of link-interface units, communication by the plurality of link-interface units with the at least one resource in accordance with the status of the at least one resource.

Both the foregoing general description and the following detailed description are exemplary and explanatory only and do not restrict the invention, as claimed. The accompanying drawings, which are incorporated in and constitute a part of this specification, illustrate several embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 2:
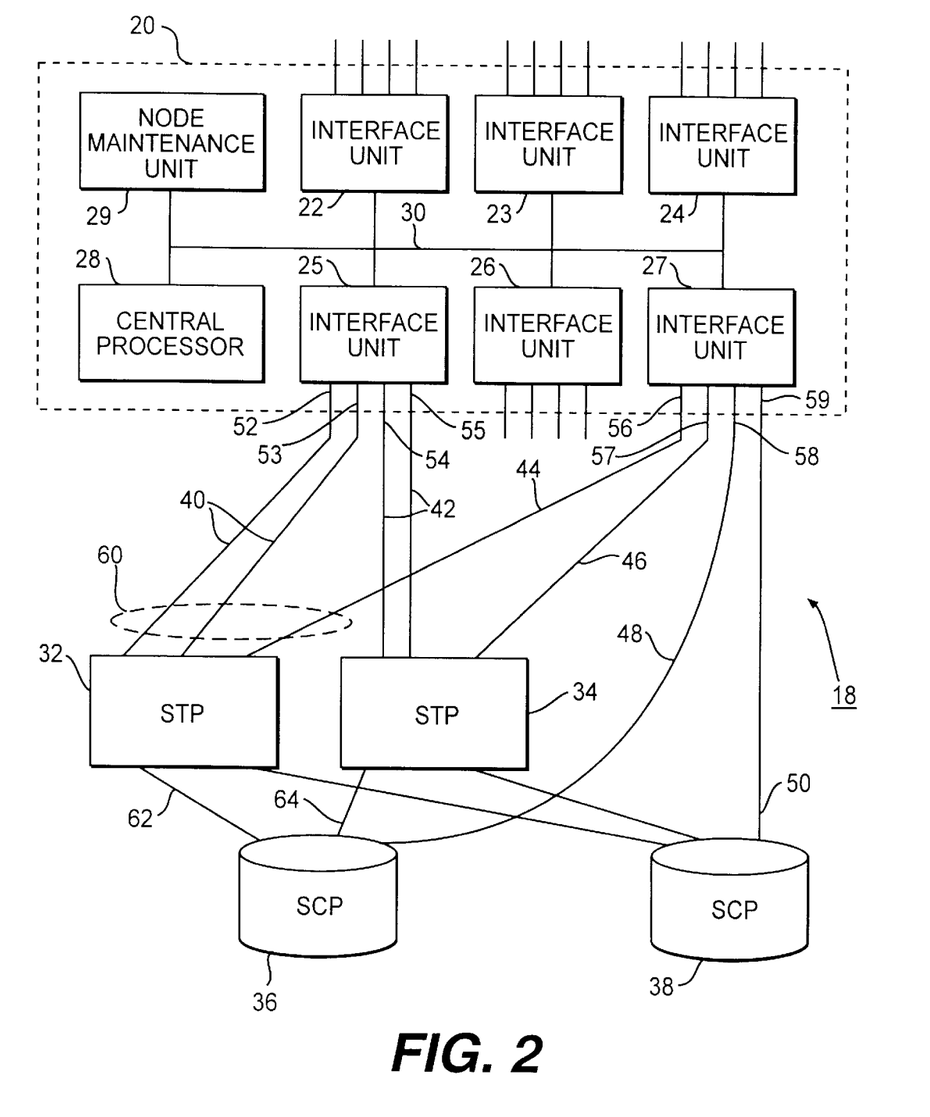
FIG. 2 is a block diagram of a signaling point consistent with the present invention within a Common Channel Signaling network.

FIG. 2 illustrates a block diagram of an STP 20 consistent with the present invention for use in a CCS network 18. STP 20 is a telecommunications switch that receives signals from other network elements, multiplexes and switches the signals appropriately, and then transmits the signals to other network elements. The STP 20 functions as both a static and dynamic routing database that controls access to, and directs call signaling between, a variety of CCS nodes and networks. STP 20 monitors, maintains, and reports different levels of information concerning the availability and unavailability of CCS nodes, routes, and services. Accordingly, STP 20 is coupled to other elements in CCS network 18, such as STPs 32 and 34 and SCPs 36 and 38. Connection between these network elements and signaling point 20 takes place across links, such as links 40, 42, 44, 46, 48, and 50. As is readily known in the art, these links comprise a transmission medium for passing telecommunication signals between endpoints.

STP 20 has a communications controller or central processor 28, which typically is a circuit card or module containing necessary electronics for controlling operation of STP 20 by executing software instructions. Communications controller 28 may be a single microprocessor or microcontroller, a group of microprocessors or microcontrollers, or a plurality of electronic modules depending on the complexity of the STP 20. For example, communications controller 28 may be a tandem of Motorola 68000-series microprocessors with associated memory running in a synchronous, matched mode of operation. Communications controller 28 may, among other things, perform system start-up and reloading for STP 20; collect, store, and output operational information about STP 20; and update or control routing information for STP 20. Communications controller 28 interfaces with other elements in STP 20 by way of central bus 30.

In addition, STP 20 includes a plurality of interface units, or link-interface units, 22–27. Interface units 22–27 are preferably circuit cards or modules containing affiliated electronics for receiving, transmitting, storing, and processing information passing through the CCS network. Each interface unit within STP 20 contains a microprocessor or microcontroller (not shown) for executing software instructions. By way of example, each interface unit 22–27 may contain a Motorola MC68000-series microprocessor or equivalent device. Interface units 22–27 also contain affiliated memory for storing software routines and necessary data for the respective interface unit.

Interface units 22–27 of STP 20 couple STP 20 to resources in the CCS network. A resource implies an element or service available to STP 20 within the CCS network. For instance, interface units 22–27 receive and transmit information between STP 20 and other elements in the CCS network, such as STPs 32 and 34 and SCPs 36 and 38. Ports, such as 52–55 for interface unit 25 and 56–59 for interface unit 27 in FIG. 2, connect interface units 22–27 with external resources. Preferably, although not exclusively, each interface unit 22–27 has four ports. In a preferred arrangement, interface units 22–27 are separate circuit cards arranged in slots of a circuit card rack. Multiple interface units and racks of interface units may be used to expand the number of connections possible with the STP 20.

As shown in FIG. 2, ports 52 and 53 connect interface unit 25 with STP 32, and ports 54 and 55 connect interface unit 25 with STP 34. Links 40 provide the communication path between interface unit 25 and STP 32. Thus, links 40 and STP 32 serve as separate resources for interface unit 25. Similarly, linkset 60, which comprises links 40 and 44 in FIG. 2, serve as another resource for STP 20. At any given time, STP 20 uses the resources of links 40 and 44, linkset 60, and STP 32 to transmit signaling information through CCS network 18.

It will be apparent that other resources are available to STP 20. A routeset, which is a collection of routes for transmitting information between end points, is another example of a resource that can couple to STP 20. For instance, if STP 20 needs to access a subsystem database within SCP 36, several routes are possible. Traffic could pass from interface unit 25 through link 40, STP 32, and link 62 to reach SCP 36. Alternatively, traffic could pass from interface unit 25 through link 42, STP 34, and link 64 to reach SCP 36. Thus, a variety of routes and routesets can serve as resources for signaling point 20 and be directly accessible by interface units 22–27.

STP 20 also includes a node maintenance unit or real-time controller 29 coupled to the interface units 22–27 by means of central bus 30. Node maintenance unit or real-time controller 29 monitors the operational status of each of interface units 22–27 and manages the continued availability of the interface units 22–27 within STP 20 for CCS network 18. As with interface units 22–27, node maintenance unit 29 may contain a microprocessor (not shown), such as a Motorola MC68000-series or the like, or a microcontroller (not shown) for executing software instructions. Alternatively, communications controller 28 may subsume node maintenance unit 29 and its functions.

The following discussion explains the context of SS7 protocols for implementing the present invention within the STP 20 illustrated in FIG. 2. As readily known to those of skill in the art, the SS7 protocols provide the framework for communication in a CCS network. The transport protocol, called Message Transfer Part (MTP), combines three different levels or layers. The first protocol level of MTP is the physical level, which operates independently of the second and third levels and provides the electrical characteristics needed to transmit over an interface in the network. The second level, called the data link level, provides the SS7 network with error detection and error correction for message packets. The third level, which is the network level, provides routing, message discrimination, message distribution, and network management functions.

Level three is preferably used to implement the present invention in one embodiment. Network management includes link management, traffic management, and route management. Link management checks for continued integrity of the links connected to an STP. Because link management concerns only nodes directly connected to a link and not the entire network, link management is a local management issue. Link management encompasses the tasks of link activation, link restoration, and link deactivation. An activate command will test the viability of a link before messages are sent across the link. A deactivate command will require that the link be dropped, and link restoration will reestablish the viability of the link after it has lost alignment.

Traffic management enables the signaling point to route traffic around failed links within a linkset. Changeover and changeback messages are sent from one signaling point to inform another signaling point of a troubled link. The receiving signaling point changes communication to another link within the linkset accordingly.

Route management addresses the accessibility of signaling points in a CCS7 network, and advises signaling points in the network if one of the signaling points cannot be reached. Route management affects larger network issues than does link management, which is relevant only to adjacent nodes of a link.

Moreover, resource management using SS7 protocol within a CCS network further includes management of subsystems or applications within an SCP. MTP only provides point-to-point routing within the CCS network. Thus, managing the access of databases within an SCP uses a separate level four protocol in SS7 called Signaling Connection Control Part (SCCP). SCCP, in contrast with MTP, does not manage the availability of the SCP itself. Instead, SCCP focuses on the status and management of a subsystem database within the SCP.

Figure 3:
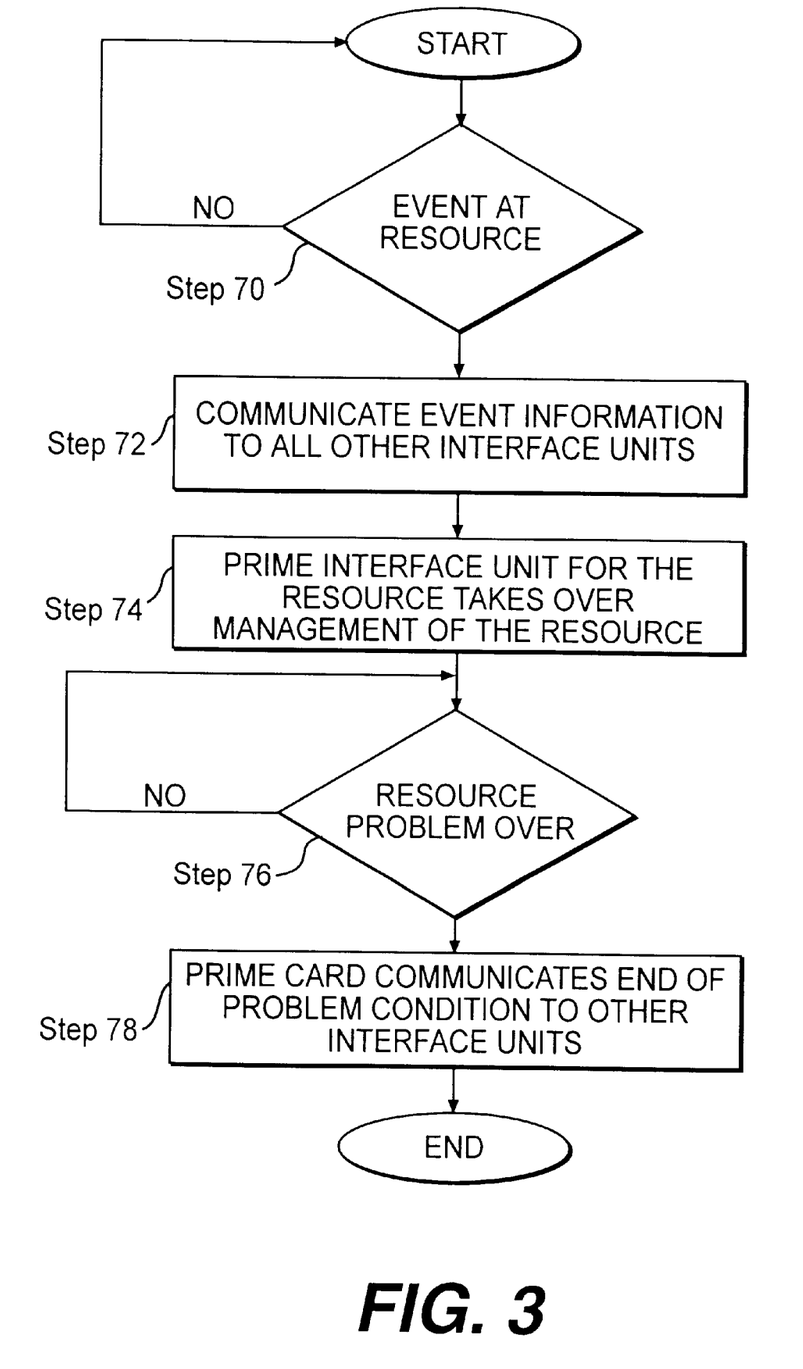
FIG. 3 is a flowchart of a method for managing resources consistent with the present invention within a Common Channel Signaling network of FIG. 2.

FIG. 3 depicts a flowchart of a method of managing CCS network resources consistent with the present invention. The method of FIG. 3 improves resource management in a signaling point by decentralizing responsibility for management of individual resources from a communications controller to individual link-interface units. Within STP 20, a particular link-interface unit has primary responsibility, otherwise known as having prime, for a selected resource coupled to the signaling point. When a management situation arises, such as when a resource stops responding to STP 20, the particular link-interface unit having prime for that resource, rather than the communications controller, takes over management of the resource.

In normal network management operation for MTP, STP 20 monitors the status of the resources to which it is coupled, such as link 40, linkset 60, a route between STP 20 and SCP 36, or a subsystem database within SCP 38. Although in a broad sense STP 20 is coupled with numerous resources, each of interface units 22–27 within STP 20 actually maintains the interface with the resources. Consequently, each of interface units 22–27 monitors the status of the resources to which it is coupled through the MTP layer. A monitored status includes, for instance, the availability or unavailability of the resource based on that resource's responses to queries from at least one of the interface units 22–27 in STP 20 and, if available, the quality of the responses from the resource. Levels 1 and 2 of MTP may indicate that a resource is operating but that its communication interface with STP 20 contains errors. Thus, during its ordinary course of establishing connections and communicating with resources, STP 20 monitors the status of the resources using MTP.

As shown in FIG. 3, each of the interface units 22–27 further monitor the resources for a change in any resources status, i.e. an event (step 70). A resource event indicates either a change of the resource's status from a normal condition to a problem condition or vice versa. Any of interface units 22–27 within STP 20 may detect an event with one of the plurality of resources serviced by signaling point 20.

By way of example and not limitation, link 44 in FIG. 2 may fail, perhaps due to the accidental severing of a transmission cable. In that situation, interface unit 27 within STP 20 will detect an out-of-service situation, i.e., an event that is a problem condition, for link 44. Interface unit 27 will then communicate the problem condition to all other interface units 22–26 within STP 20 (step 72). Interface unit 27 in STP 20 will communicate via central bus 30 with the other interface units.

Upon learning of the event with link 44, the interface unit having prime for link 44 will take over management of link 44 (step 74) in accordance with MTP management. The prime interface unit for link 44 may become aware of the event either through the communication from the interface unit that detected the event or through the prime interface unit's own communications with link 44. For example, referring to FIG. 2 for MTP, if interface unit 23 is prime for link 44, interface unit 23 will learn of the event from the communication by interface unit 27 via central bus 30. However, if interface unit 27 is prime for link 44, interface unit 27 will learn of the event based on its interface with link 44.

STP 20 predetermines which interface unit will have primary responsibility for managing communications with a particular resource. As a result, at any given time, MTP prime for each resource coupled to STP 20 can be identified at one of the interface units 22–27. Also, communications controller 28 could share prime with interface units 22–27 by being prime for selected resources. Preferably, each prime interface unit has responsibility for a particular resource, despite the type of problem that the resource encounters. Alternatively, prime may be based on some other standard for the resources, such as the type of event or problem detected from the resource.

Due to the distributed architecture of STP 20, each interface unit has the ability to control the management of any resource coupled to STP 20. Central bus 30 enables commands to travel within STP 20 between interface units so that direct or indirect communication may take place between the prime interface unit and the resource that experienced an event. Consequently, STP 20 can effectively manage multiple and simultaneous failures from its resources without constraining communications controller 28. Also, because only one interface unit is prime for a given resource, multiple management efforts will not arise by interface units 22–27 or communications controller 28 within STP 20.

Management of the resource by the prime interface unit can cover a variety of standard resource management functions, both for the SS7 MTP and the SCCP. For MTP, for example, the prime interface unit may activate or deactivate a link in response to a problem condition at the link to try to reestablish the operability of that link. If a node, such as STP 32 stops responding to STP 20, the prime interface unit within STP 20 may effect route management using changeover and/or changeback commands to avoid STP 32.

Typically, the prime interface unit continues to manage communications by STP 20 with the resource that experienced a problem event until that event ends (step 76). Upon conclusion of the event, for example when an out-of-service link becomes available again, the prime interface unit communicates the updated status of the resource to the other interface units in STP 20 (step 78). At that time, the other interface units will update their memory lists that indicate the available resources and may resume communications in CCS network 18 using the available resource.

Figure 4:
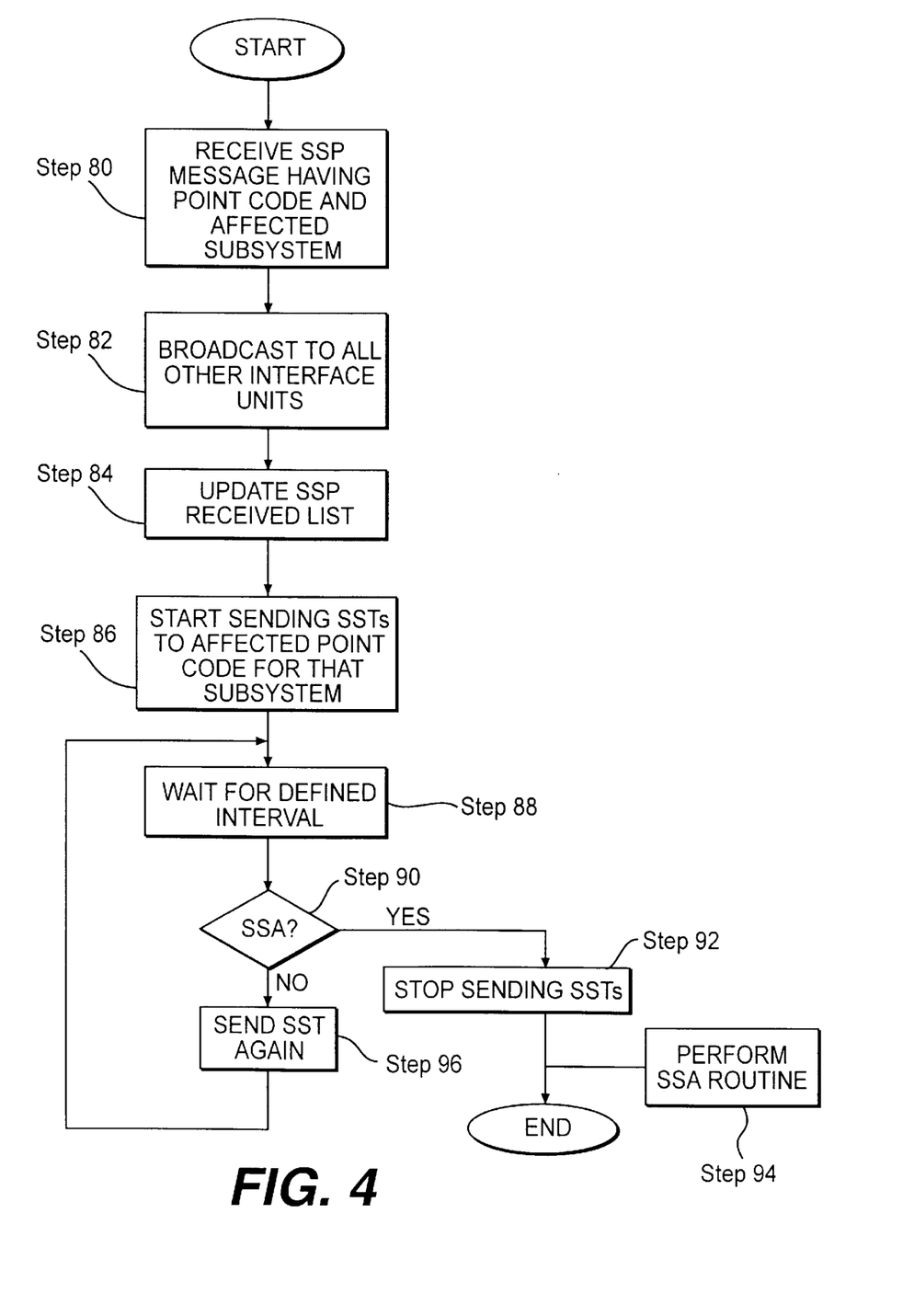
FIG. 4 is a flowchart of a method performed by an interface unit within the signaling point of FIG. 2 for managing a subsystem database within a Service Control Point consistent with the present invention.
Figure 5:
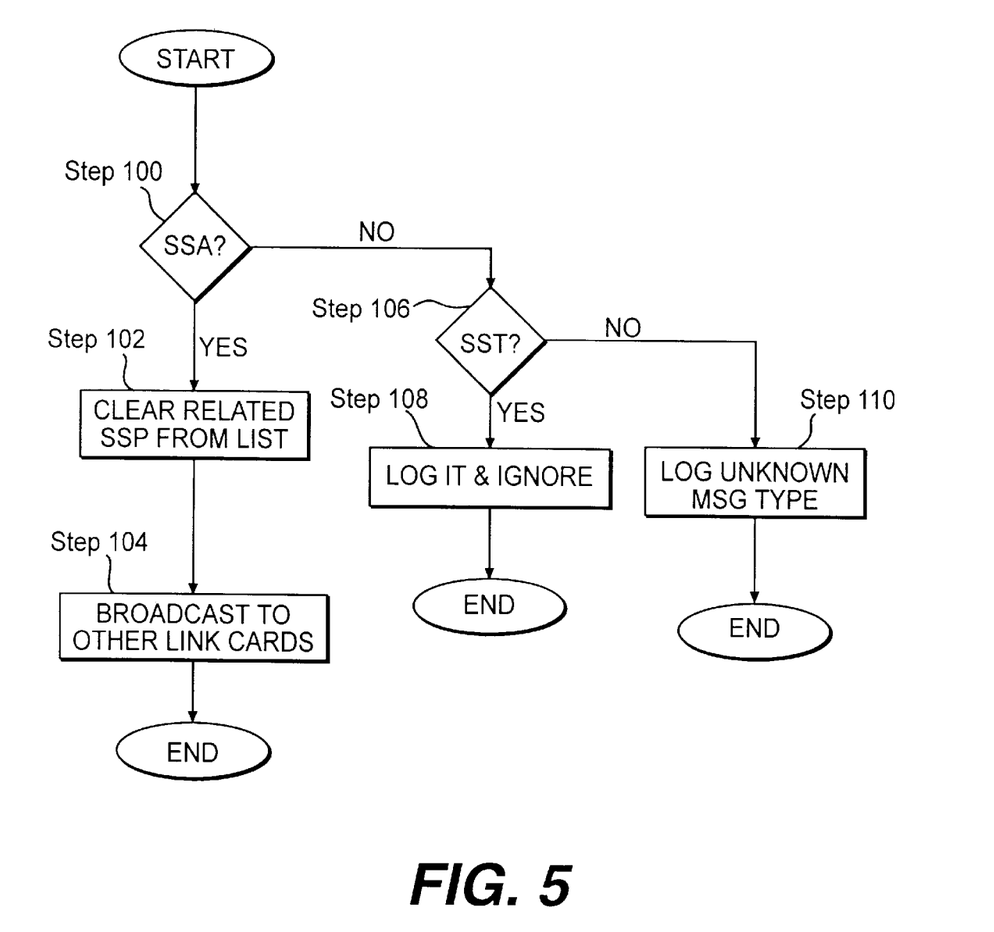
FIG. 5 is a flowchart of a method performed by an interface unit within the signaling point of FIG. 2 upon receiving a non-Subsystem Prohibit message from a subsystem database consistent with the present invention.

FIGS. 4 and 5 illustrate preferred methods for managing a subsystem database within an SCP using SCCP in accordance with the present invention. Subsystem databases for CCS network reside in SCPs, where each SCP has a unique identifier called a point code. A series of queries or commands between STP 20 and SCP 38, for example, indicate the status of a subsystem database within SCP 38.

As shown in FIG. 4, when an event occurs at a subsystem database, an interface unit, such as interface unit 27, will receive an SCCP message from SCP 38 (step 80). That message can be, for instance, a subsystem prohibit (SSP), a subsystem available (SSA), or a subsystem test (SST) message. If interface unit 27 receives an SSP, which indicates that a problem event has occurred with the subsystem of SCP 38, interface unit 27 will broadcast that information to all other interface units in STP 20 using central bus 30 (step 82). In a preferred embodiment, interface unit 27 will broadcast the point code and subsystem experiencing the event along with its own interface unit identifier. Interface unit 27 will then update a list of received SSPs stored in interface unit 27 with the new SSP obtained from SCP 38 (step 84) and that it was the interface unit that received the SSP, as will all other interface units within STP 20.

Assume that interface unit 23 has prime for SCP 38. At this time, interface unit 23 will take over management of the subsystem in SCP 38 because the received SSP indicated a problem event with that subsystem database. Interface unit 23 will then manage communications by STP 20 with the subsystem database in SCP 38 by periodically sending SST test signals to the point code affiliated with the database (step 86). After polling the point code of the database with an SST signal, interface unit 23 waits a defined time interval for a response (step 88). If the point code (SCP 38) responds with an SSA signal that indicates that the subsystem has become available (step 90), interface unit 23 stops polling the point code with SST signals (step 92) and performs an SSA routine (step 94), described in more detail below. If the point code does not respond with an SSA signal, interface unit 23 continues polling the point code (step 96). Often, the point code will provide an unsolicited SSA signal, indicating that the subsystem has become available. SCCP management of the STP will send SST signals in the event that an SSA message from the affected point code was missed or not received.

FIG. 5 illustrates a preferred method performed by an interface unit upon receiving a message from a subsystem that is not an SSP message. First, the interface unit determines whether the received message is an SSA message (step 100), which indicates that the subsystem database has become available. If so, the interface unit clears an SSP status for the responding subsystem from a stored list (step 102), and then broadcasts this updated status to the other interface units in signaling point 20 (step 104). If the received message is not an SSA but an SST, the receiving interface unit will simply log receipt of the message and ignore it (steps 106 and 108). This technique applies to the preferred embodiment that is an STP with remote subsystems, but without local subsystems. For an embodiment having local subsystems, SCCP management will receive SST messages and respond to them appropriately, rather than simply logging and ignoring them. If the received message is neither an SSA nor an SST, the receiving interface unit will log the message as an unknown message type (steps 106 and 110).

While the prime interface card controls management of the resource after an event occurs, the other interface cards remain informed of the status of the management by receiving periodic broadcasts from the prime card. Preferably, each interface unit maintains an SSP list that identifies resources for signaling unit that are not available. As the status of these resources changes, the prime interface unit broadcasts the changed status to the other interface units, and those units update their resource lists accordingly.

The present invention further contemplates the assignment of prime to a new interface unit if the current prime interface unit of a particular resource fails or become unavailable. In accordance with the present invention, another of the interface units will assume management of the communication of the interface units with the problem resource when the prime interface unit fails. In this way, prime remains with the interface units 22–27 rather than with the communications controller 28.

The assumption of management by another interface unit upon failure of the prime interface unit may occur in several ways. Difficulties with an interface unit may occur due to hardware failures or software errors that may cause the microprocessor within the interface unit to no longer function. Node maintenance unit 29 may instruct another interface unit to become prime for the respective resource. For example, if node 27 initially has prime for link 42 and fails because its microprocessor seizes, node maintenance unit 29 may direct another link-interface unit, such as interface unit 25, to assume prime for that resource. Alternatively, other elements of signaling point 20 besides node maintenance unit 29, particularly communications controller 28, may direct the reassignment of prime. Upon assuming prime, the interface unit will respond to any problem conditions that arise from the resource, as described herein and set forth in FIG. 3. In this manner, node maintenance unit 29 insures that one of interface units 22–27 always has prime for each of the resources communicatively coupled with STP 20.

Alternatively, when a prime interface unit fails or otherwise becomes unavailable, another interface unit within STP 20 may assume prime for the resource based on a predetermined priority among the interface units 22–27. In a preferred embodiment, each interface unit may contain within its memory a look-up table indicating a priority for that interface unit in assuming prime for another failed interface unit. If, for example, interface unit 25 has prime for resource STP 32 and interface unit 25 fails or becomes unavailable, look-up table in interface unit 27 may indicate that it must become prime for resource STP 32. Preferably, the look-up table will be based on the physical location of interface units 22–27. For instance, the look-up table in interface unit 27 may indicate that it must assume prime from an interface unit that is two card slots lower than interface unit 27 when the card in the lower location fails or becomes unavailable. In such a scenario, because interface unit 25 is two card slots lower than interface unit 27, interface unit 27 would automatically assume prime upon the failure of interface unit 25.

Figure 6:
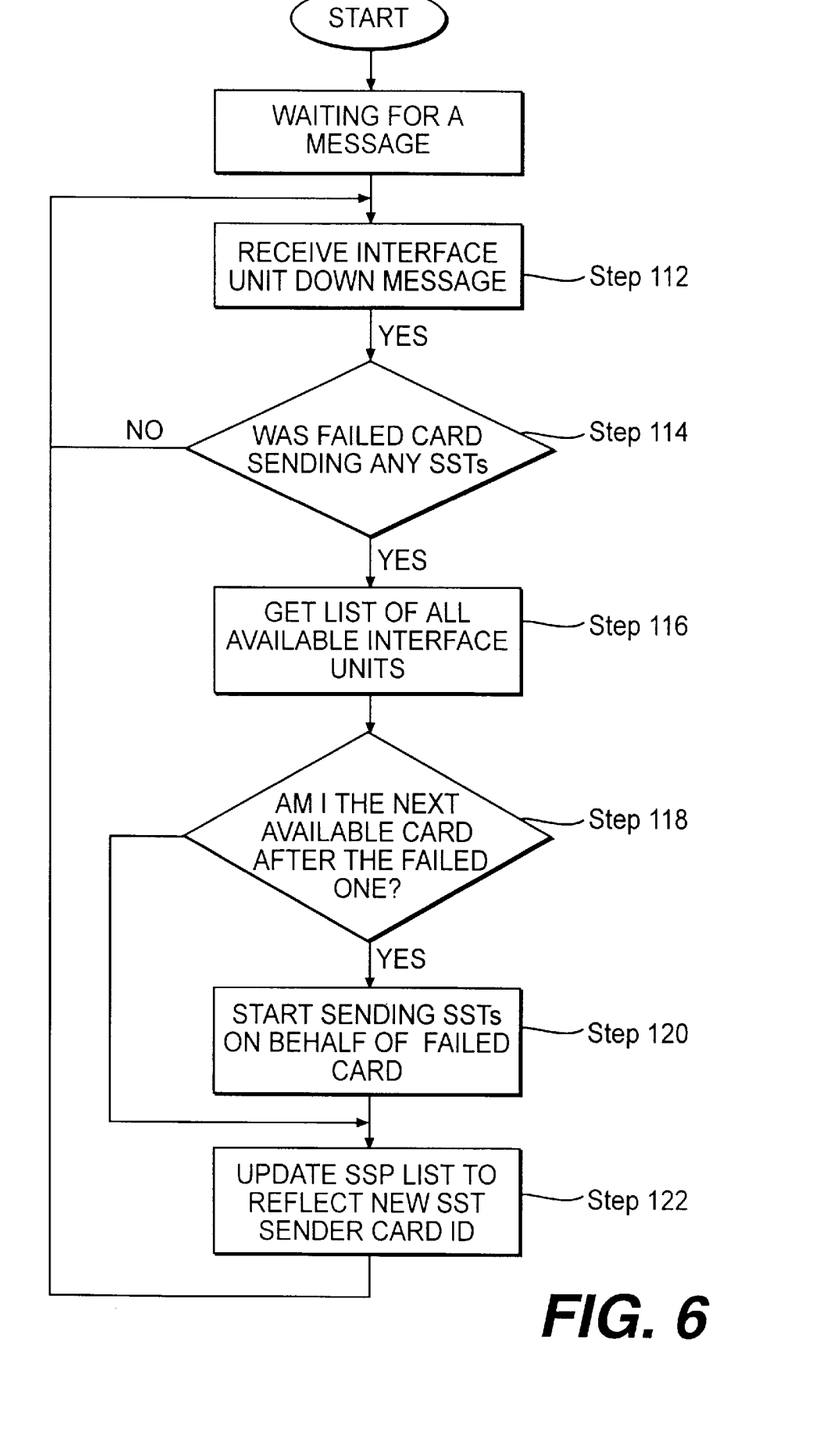
FIG. 6 is a flowchart of a method performed by an interface unit within the signaling point of FIG. 2 upon failure of another interface unit.

FIG. 6 depicts a preferred method performed by all non-prime interface units upon the failure of one of the interface units. Node maintenance unit 29 monitors the status of each of the link-interface units 22–27 and will broadcast to all of the interface cards information about the unavailability of any one of them. Thus, upon failure of an interface unit, each of the other interface units will receive a message from node maintenance unit 29 that one of the interface units has failed (step 112).

Upon receiving this information, each of those interface units will check its stored lists to determine if the failed interface unit was currently polling any of the resources of STP 20 (step 114). If not, no further action is taken by the interface unit. If that unit has responsibility for becoming prime in place of the failed interface unit, it will take appropriate action upon an event at the respective resource.

If the stored lists of the interface unit indicate that the failed unit was currently polling a resource, then the interface unit will search its memory to identify all the available interface units, i.e. those additional interface units that have not failed (step 116). If the searching interface unit finds that it is the "next" interface unit in STP 20, then it will assume the ongoing management responsibilities of the failed interface unit by sending SST messages to the problem subsystem (steps 11 8 and 120). The next interface unit may be "next" based on address location, physical location, or any other criteria for ordering interface units 22–27 in STP 20. Also, the "next" unit may be the succeeding, the preceding, the nth, or any other criteria for ordering. After sending SST messages in place of the failed interface unit, the new prime unit will revise its SSP list, as will all other interface units, to show its address as the sending address for current SSPs to the problem resource in place of the failed unit (step 122).

Systems consistent with the present invention provide several advantages over existing systems. By decentralizing management of external resources within a signaling point, the present invention avoids overwhelming communications controller 28. Having prime responsibility for managing resources distributed throughout interface units 22–27, STP 20 can effectively manage multiple and simultaneous failures from its resources without constraining communications controller 28. Moreover, because each prime interface unit manages communications with a single resource for all possible problem conditions from that resource, STP 20 can successfully avoid having multiple management efforts arise from multiple interface units. Thus, the STP consistent with the present invention has improved reliability of its network management without the risk of total failure inherent in an STP having a communications controller for handling all management activities. Also, the STP consistent with the present invention provides dynamic assumption or takeover of primeship. The STP obviates the need to explicitly provision which interface units should take over in the event of failure of other interface units, decreasing the work for maintenance personnel and reducing the risk of human error.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A signaling point for use in a common channel signaling (CCS) network, the signaling point comprising:
   a communications controller; and
   a plurality of link-interface units coupled to the communications controller for coupling the signaling point to resources in the CCS network, one of the link-interface units containing means for managing communication by the plurality of link-interface units with a selected CCS resource in accordance with a status of the selected CCS resource.

2. The signaling point of claim 1, wherein the means for managing manages communication by the plurality of link-interface units with a linkset.

3. The signaling point of claim 1, wherein the means for managing manages communication by the plurality of link-interface units with a routeset.

4. The signaling point of claim 1, wherein the means for managing manages communication by the plurality of link-interface units with a subsystem.

5. The signaling point of claim 1, wherein the link-interface units include
   means for receiving a signal indicating that one of the link-interface units has failed;
   and means for assuming managing the communication by the link-interface units with the selected CCS resource in accordance with the status of the selected CCS resource.

6. A signaling point for use in a common channel signaling (CCS) network, the signaling point comprising:

a communications controller;

a plurality of link-interface units coupled to the communications controller for coupling the signaling point to resources in the CCS network, one of the link-interface units containing means for managing communications by the plurality of link-interface units with a selected CCS resource in accordance with a status of the selected CCS resource, the link-interface units further including means for receiving a signal indicating that one of the link-interface units has failed and means for assuming managing the communication by the lin-interface units with the selected CCS resource in accordance with the status of the selected CCS resource; and a node maintenance unit coupled to the link-interface units, the node maintenance unit including means for directing one of the link-interface units to begin assuming managing the communication by the link-interface units with the selected CCS resource.

7. The signaling point of claim 5, wherein the means for assuming managing includes means for assessing a predetermined priority among the link-interface units.

8. The signaling point of claim 1, wherein the one link-interface unit manages communication by the link-interface units with the at least one resource after another of the link-interface units detects the status of the selected CCS resource and communicates the status to the link-interface units.

9. A method for managing resources in a common channel signaling (CCS) network from a telecommunications switch, the telecommunications switch including a plurality of interface units coupling the switch to a plurality of resources in the CCS network, the method comprising the steps of:

detecting, at an interface unit, a problem condition of one of the resources;

communicating the problem condition of the resource directly from the detecting interface unit to the other interface units;

verifying, by a processor within one of the plurality of interface units, the problem condition; and coordinating, at the processor within the one of the plurality of interface units, further communication by the plurality of interface units intended for the one resource until the problem condition of the one resource changes.

10. The method of claim 9, wherein the one of the interface units manages communication by the plurality of interface units with the one resource in response to all problem conditions of the one resource.

11. A method for managing resources in a common channel signaling (CCS) network from a telecommunications switch, the telecommunications switch including a plurality of interface units coupling the switch to a plurality of resources in the CCS network, the method comprising the steps of:

detecting, at an interface unit, a problem condition of one of the resources;

communicating the problem condition of the resource from the detecting interface unit to the other interface units;

verifying, by a processor within one of the plurality of interface units, the problem condition;

coordinating, at the processor within the one of the plurality of interface units, further communication by the plurality of interface units intended for the one resource until the problem condition of the one resource changes; and assuming, by a backup one of the plurality of interface units, management of the communication by the plurality of interface units with the one resource when the one of the plurality of interface units fails.

12. The method of claim 9, further comprising the step of managing the communication by the plurality of interface units with the one resource using Message Transfer Part protocol of Signaling System No. 7.

13. The method of claim 12, wherein the detecting step detects the problem condition of a linkset connecting the telecommunications switch with a node in the CCS network.

14. The method of claim 12, wherein the detecting step detects the problem condition of a routeset for communicating information between the telecommunications switch and a node in the CCS network.

15. The method of claim 9, further comprising the step of managing the communication by the plurality of interface units with the one resource using Signaling Connection Control Part protocol of Signaling System No. 7.

16. The method of claim 15, wherein the detecting step detects the problem condition of a subsystem database within a service control point in the CCS network.

17. A method for managing resources in a common channel signaling (CCS) network from a telecommunications switch, the telecommunications switch including a plurality of interface units coupling the switch to a plurality of resources in the CCS network, each of the plurality of resources having a status condition, and the method comprising the steps of:

detecting, at any of the interface units, a change in the status condition of multiple resources simultaneously;

communicating the changed status conditions directly from the detecting interface unit to the other ones of the interface units; and managing, at ones of the interface units, communication by the plurality of interface units with the multiple resources.

18. A method for managing resources in a common channel signaling (CC S) network from a signaling point, the signaling point including a plurality of link-interface units communicatively coupling the signaling point to a plurality of resources in the CCS network, each of the plurality of link-interface units having a link processor, the method comprising the steps of:

determining, at one of the link-interface units, a status of one of the resources; and managing, at the one link-interface unit, communication by the link-interface units with the resource in accordance with the status of the at least one resource.

19. A method for managing resources in a common channel signaling (CCS) network from a signaling point, the signaling point including a plurality of link-interface units communicatively coupling the signaling point to a plurality of resources in the CCS network, each of the plurality of link-interface units having a link processor, the method comprising the steps of:

determining, at one of the link-interface units, a status of one of the resources;

managing, at the one link-interface unit, communication by the link-interface units with the resource in accordance with the status of the at least one resource; and commencing, by a backup one of the plurality of link-interface units, management of the communication by the link-interface units with the resource, when the one link-interface unit fails.

20. The method of claim 19, further including the step of directing the backup link-interface unit to commence managing the communication by the link-interface units with the resource.

21. The method of claim 19, further including the step of assuming managing the communication by the link-interface units with the resource by a backup one of the link interface units chosen according to a predetermined priority among the link-interface units.

22. The method of claim 21, further including the step of storing tables of the predetermined priority in the link interface units.

23. The method of claim 18, further comprising the step of managing the communication by the link-interface units with the at least one resource using Message Transfer Part protocol of Signaling System No. 7.

24. The method of claim 23, wherein the determining step determines the status of a linkset connecting the one of the link-interface units with a node in the CCS network.

25. The method of claim 23, wherein the determining step determines the status of a routeset for communicating information between the signaling point and a node in the CCS network.

26. The method of claim 18, further comprising the step of managing the communication by the link-interface units with the at least one resource using Signaling Connection Control Part protocol of Signaling System No. 7.

27. The method of claim 26, wherein the determining step determines the status of a subsystem database within a service control point in the CCS network.

* * * * *

UNITED STATES PATENT AND TRADEMARK OFFICE
CERTIFICATE OF CORRECTION

PATENT NO. : 5,898,667
DATED : April 27, 1999
INVENTOR(S) : Michael Longfield et al.

It is certified that error appears in the above-identified patent and that said Letters Patent is hereby corrected as shown below:

IN THE CLAIMS:

Claim 6, Col. 11, line 11, change "lin" to --link--.

Signed and Sealed this

Nineteenth Day of October, 1999

Attest:

Q. TODD DICKINSON

Attesting Officer

Acting Commissioner of Patents and Trademarks